(12) United States Patent
Payne (10) Patent No.: US 7,254,724 B2
(45) Date of Patent: Aug. 7, 2007

(54) POWER MANAGEMENT SYSTEM (75) Inventor: Robert Edwin Payne, Edinburgh (GB)

(73) Assignee: Lexar Media, Inc., Fremont, CA (US)

( * ) Notice: Subject to any disclaimer, the term of this patent is extended or adjusted under 35 U.S.C. 154(b) by 379 days.

(21) Appl. No.: 10/256,804

(22) Filed: Sep. 27, 2002

(65) Prior Publication Data

US 2003/0126481 A1    Jul. 3, 2003

(51) Int. Cl.
*G06F 1/32* (2006.01)
(52) U.S. Cl. ............... 713/320; 713/321; 713/322
(58) Field of Classification Search ............. 713/320, 713/321, 322
See application file for complete search history.

(56) References Cited

U.S. PATENT DOCUMENTS

| | | | |
|---|---|---|---|
| 4,099,069 A | 7/1978 | Cricchi et al. | |
| 4,130,900 A | 12/1978 | Watanabe | |
| 4,210,959 A | 7/1980 | Wozniak | 364/200 |
| 4,309,627 A | 1/1982 | Tabata | |
| 4,355,376 A | 10/1982 | Gould | 365/230 |
| 4,398,248 A | 8/1983 | Hsia et al. | |
| 4,405,952 A | 9/1983 | Slakmon | 360/49 |
| 4,414,627 A | 11/1983 | Nakamura | |
| 4,450,559 A | 5/1984 | Bond et al. | 371/10 |
| 4,456,971 A | 6/1984 | Fukuda et al. | 364/900 |
| 4,468,730 A | 8/1984 | Dodd et al. | |
| 4,473,878 A | 9/1984 | Zolnowsky et al. | |
| 4,476,526 A | 10/1984 | Dodd | |
| 4,498,146 A | 2/1985 | Martinez | 364/900 |
| 4,525,839 A | 6/1985 | Nozawa et al. | 371/38 |
| 4,532,590 A | 7/1985 | Wallach et al. | |
| 4,609,833 A | 9/1986 | Guterman | |
| 4,616,311 A | 10/1986 | Sato | 364/200 |
| 4,654,847 A | 3/1987 | Dutton | 371/10 |
| 4,710,871 A | 12/1987 | Belknap et al. | 364/200 |
| 4,746,998 A | 5/1988 | Robinson et al. | 360/72.1 |
| 4,748,320 A | 5/1988 | Yorimoto et al. | 235/492 |
| 4,757,474 A | 7/1988 | Fukushi et al. | 365/189 |

(Continued)

FOREIGN PATENT DOCUMENTS

AU    0 557 723    1/1987

(Continued)

OTHER PUBLICATIONS

Book—*Computer Architecture and Parallel Processing*, Kai Hwang & Faye A. Briggs, McGraw-Hill Book Co., © 1984, pp. 64.

(Continued)

*Primary Examiner*—Thomas Lee
*Assistant Examiner*—Vincent Tran
(74) *Attorney, Agent, or Firm*—Leffert, Jay & Polglaze P.A.

(57) ABSTRACT

According to one embodiment of the present invention, there is provided a power management system for use in a computer system having a memory system incorporating a non-volatile memory and a controller which presents the logical characteristics of a disc storage device to a host, the power management system comprising means for monitoring the operational activity levels within at least some of the components of the controller and arranged, in response to the monitored levels, to vary the power consumed by selected components of the controller.

16 Claims, 3 Drawing Sheets

U.S. PATENT DOCUMENTS

| | | | | |
|---|---|---|---|---|
| 4,774,700 | A | 9/1988 | Satoh et al. | 369/54 |
| 4,780,855 | A | 10/1988 | Iida et al. | |
| 4,788,665 | A | 11/1988 | Fukuda et al. | |
| 4,797,543 | A | 1/1989 | Watanabe | |
| 4,800,520 | A | 1/1989 | Iijima | 364/900 |
| 4,829,169 | A | 5/1989 | Watanabe | |
| 4,843,224 | A | 6/1989 | Ohta et al. | |
| 4,896,262 | A | 1/1990 | Wayama et al. | 364/200 |
| 4,914,529 | A | 4/1990 | Bonke | 360/48 |
| 4,920,518 | A | 4/1990 | Nakamura et al. | 365/228 |
| 4,924,331 | A | 5/1990 | Robinson et al. | 360/72.1 |
| 4,943,745 | A | 7/1990 | Watanabe et al. | |
| 4,953,122 | A | 8/1990 | Williams | 364/900 |
| 4,970,642 | A | 11/1990 | Yamamura | |
| 4,970,727 | A | 11/1990 | Miyawaki et al. | |
| 5,070,474 | A | 12/1991 | Tuma et al. | 395/500 |
| 5,093,785 | A | 3/1992 | Iijima | |
| 5,167,024 | A * | 11/1992 | Smith et al. | 713/322 |
| 5,168,465 | A | 12/1992 | Harari | 257/320 |
| 5,198,380 | A | 3/1993 | Harari | 437/43 |
| 5,200,959 | A | 4/1993 | Gross et al. | 371/21.6 |
| 5,218,695 | A | 6/1993 | Noveck et al. | |
| 5,220,518 | A | 6/1993 | Haq | |
| 5,226,168 | A | 7/1993 | Kobayashi et al. | 395/800 |
| 5,227,714 | A | 7/1993 | Lou | |
| 5,253,351 | A | 10/1993 | Yamamoto et al. | |
| 5,267,218 | A | 11/1993 | Elbert | |
| 5,268,318 | A | 12/1993 | Harari | 437/43 |
| 5,268,870 | A | 12/1993 | Harari | 365/218 |
| 5,270,979 | A | 12/1993 | Harari et al. | 365/218 |
| 5,293,560 | A | 3/1994 | Harari | 365/185 |
| 5,297,148 | A | 3/1994 | Harari et al. | 371/10.2 |
| 5,303,198 | A | 4/1994 | Adachi et al. | 365/218 |
| 5,305,276 | A | 4/1994 | Uenoyama | |
| 5,305,278 | A | 4/1994 | Inoue | |
| 5,315,541 | A | 5/1994 | Harari et al. | 365/63 |
| 5,315,558 | A | 5/1994 | Hag | |
| 5,329,491 | A | 7/1994 | Brown et al. | |
| 5,337,275 | A | 8/1994 | Garner | 365/189.01 |
| 5,341,330 | A | 8/1994 | Wells et al. | 365/185 |
| 5,341,339 | A | 8/1994 | Wells | |
| 5,341,341 | A | 8/1994 | Fukuzo | |
| 5,353,256 | A | 10/1994 | Fandrich et al. | 365/230.03 |
| 5,357,475 | A | 10/1994 | Hasbun et al. | 365/218 |
| 5,359,569 | A | 10/1994 | Fujita et al. | |
| 5,365,127 | A | 11/1994 | Manley | |
| 5,369,615 | A | 11/1994 | Harari et al. | 365/218 |
| 5,371,702 | A | 12/1994 | Nakai et al. | |
| 5,381,539 | A | 1/1995 | Yanai et al. | |
| 5,382,839 | A | 1/1995 | Shinohara | |
| 5,384,743 | A | 1/1995 | Rouy | |
| 5,388,083 | A | 2/1995 | Assar et al. | 365/218 |
| 5,396,468 | A | 3/1995 | Harari et al. | 365/218 |
| 5,404,485 | A | 4/1995 | Ban | |
| 5,406,527 | A | 4/1995 | Honma | |
| 5,418,752 | A | 5/1995 | Harari et al. | 365/218 |
| 5,422,842 | A | 6/1995 | Cernea et al. | 365/185 |
| 5,422,856 | A | 6/1995 | Sasaki et al. | |
| 5,428,621 | A | 6/1995 | Mehrotra et al. | 371/21.4 |
| 5,430,682 | A | 7/1995 | Ishikawa et al. | |
| 5,430,859 | A | 7/1995 | Norman et al. | 395/425 |
| 5,431,330 | A | 7/1995 | Wieres | |
| 5,434,825 | A | 7/1995 | Harari | 365/185 |
| 5,438,573 | A | 8/1995 | Mangan et al. | 371/10.3 |
| 5,465,235 | A | 11/1995 | Miyamoto | |
| 5,465,338 | A | 11/1995 | Clay | |
| 5,471,478 | A | 11/1995 | Mangan et al. | 371/10.3 |
| 5,473,765 | A | 12/1995 | Gibbons et al. | |
| 5,479,638 | A | 12/1995 | Assar et al. | 395/430 |
| 5,485,595 | A | 1/1996 | Assar et al. | 395/430 |
| 5,490,117 | A | 2/1996 | Oda et al. | |
| 5,495,442 | A | 2/1996 | Cernea et al. | 365/185.03 |
| 5,504,760 | A | 4/1996 | Harari et al. | 371/40.1 |
| 5,508,971 | A | 4/1996 | Cernea et al. | 365/185.23 |
| 5,513,138 | A | 4/1996 | Manabe et al. | |
| 5,515,333 | A | 5/1996 | Fujita et al. | |
| 5,519,847 | A | 5/1996 | Fandrich et al. | |
| 5,523,980 | A | 6/1996 | Sakui et al. | |
| 5,524,230 | A | 6/1996 | Sakaue et al. | 395/430 |
| 5,530,673 | A | 6/1996 | Tobita et al. | |
| 5,530,828 | A | 6/1996 | Kaki et al. | |
| 5,530,938 | A | 6/1996 | Akasaka et al. | |
| 5,532,962 | A | 7/1996 | Auclair et al. | 365/201 |
| 5,532,964 | A | 7/1996 | Cernea et al. | 365/189.09 |
| 5,534,456 | A | 7/1996 | Yuan et al. | 437/43 |
| 5,535,328 | A | 7/1996 | Harari et al. | 395/182.05 |
| 5,541,551 | A | 7/1996 | Brehner et al. | |
| 5,544,118 | A | 8/1996 | Harari | 365/218 |
| 5,544,356 | A | 8/1996 | Robinson et al. | 395/600 |
| 5,546,591 | A * | 8/1996 | Wurzburg et al. | 713/322 |
| 5,552,698 | A | 9/1996 | Tai et al. | |
| 5,554,553 | A | 9/1996 | Harari | 437/43 |
| 5,563,825 | A | 10/1996 | Cernea et al. | 365/185.18 |
| 5,566,314 | A | 10/1996 | DeMarco et al. | 395/430 |
| 5,568,439 | A | 10/1996 | Harari | 365/218 |
| 5,572,466 | A | 11/1996 | Sukegawa | |
| 5,579,502 | A | 11/1996 | Konishi et al. | |
| 5,581,723 | A | 12/1996 | Hasbun et al. | |
| 5,583,812 | A | 12/1996 | Harari | 365/185.33 |
| 5,592,415 | A | 1/1997 | Kato et al. | |
| 5,592,420 | A | 1/1997 | Cernea et al. | 365/185.18 |
| 5,596,526 | A | 1/1997 | Assar et al. | |
| 5,596,756 | A * | 1/1997 | O'Brien | 713/340 |
| 5,598,370 | A | 1/1997 | Niijima et al. | |
| 5,602,987 | A | 2/1997 | Harari et al. | |
| 5,603,001 | A | 2/1997 | Sukegawa et al. | |
| 5,606,660 | A | 2/1997 | Estakhri et al. | |
| 5,606,704 | A | 2/1997 | Pierce et al. | |
| 5,611,067 | A | 3/1997 | Okamoto et al. | |
| 5,640,528 | A | 6/1997 | Harney et al. | |
| 5,642,312 | A | 6/1997 | Harari | 365/185.33 |
| 5,648,929 | A | 7/1997 | Miyamoto | |
| 5,663,901 | A | 9/1997 | Wallace et al. | 365/52 |
| 5,693,570 | A | 12/1997 | Cernea et al. | 437/205 |
| 5,712,819 | A | 1/1998 | Harari | 365/185.33 |
| 5,719,808 | A | 2/1998 | Harari et al. | 365/185.33 |
| 5,723,990 | A | 3/1998 | Roohparvar | |
| 5,734,567 | A | 3/1998 | Griffiths et al. | |
| 5,745,418 | A | 4/1998 | Ma et al. | |
| 5,754,567 | A | 5/1998 | Norman | |
| 5,757,712 | A | 5/1998 | Nagel et al. | |
| 5,758,100 | A | 5/1998 | Odisho | |
| 5,761,117 | A | 6/1998 | Uchino et al. | |
| 5,768,190 | A | 6/1998 | Tanaka et al. | |
| 5,768,195 | A | 6/1998 | Nakamura et al. | |
| 5,773,901 | A | 6/1998 | Kantner | |
| 5,778,418 | A | 7/1998 | Auclair et al. | 711/101 |
| 5,781,478 | A | 7/1998 | Takeuchi et al. | |
| 5,787,445 | A | 7/1998 | Daberko | |
| 5,787,484 | A | 7/1998 | Norman | |
| RE35,881 | E | 8/1998 | Barrett et al. | |
| 5,799,168 | A | 8/1998 | Ban | |
| 5,802,551 | A | 9/1998 | Komatsu et al. | |
| 5,809,515 | A | 9/1998 | Kaki et al. | |
| 5,809,558 | A | 9/1998 | Matthews et al. | |
| 5,809,560 | A | 9/1998 | Schneider | |
| 5,818,350 | A | 10/1998 | Estakhri et al. | |
| 5,818,781 | A | 10/1998 | Estakhri et al. | |
| 5,822,245 | A | 10/1998 | Gupta et al. | |
| 5,822,252 | A | 10/1998 | Lee et al. | |
| 5,822,781 | A | 10/1998 | Wells et al. | |
| 5,831,929 | A | 11/1998 | Manning | |
| 5,835,935 | A | 11/1998 | Estakhri et al. | |
| 5,838,614 | A | 11/1998 | Estakhri et al. | |

| | | | | | |
|---|---|---|---|---|---|
| 5,845,313 A | 12/1998 | Estakhri et al. | 6,377,185 B1* | 4/2002 | Halleck et al. ............. 340/669 |
| 5,847,552 A | 12/1998 | Brown | 6,385,667 B1 | 5/2002 | Estakhri et al. |
| 5,860,083 A | 1/1999 | Sukegawa | 6,393,513 B2 | 5/2002 | Estakhri et al. |
| 5,860,124 A | 1/1999 | Matthews et al. | 6,397,314 B1 | 5/2002 | Estakhri et al. |
| 5,862,099 A | 1/1999 | Gannage et al. | 6,411,546 B1 | 6/2002 | Estakhri et al. |
| 5,884,088 A * | 3/1999 | Kardach et al. ............ 713/324 | 6,467,021 B1 | 10/2002 | Sinclair |
| 5,890,192 A | 3/1999 | Lee et al. | 6,490,649 B2 | 12/2002 | Sinclair |
| 5,901,086 A | 5/1999 | Wang et al. | 6,567,307 B1 | 5/2003 | Estakhri |
| 5,907,856 A | 5/1999 | Estakhri et al. | 6,578,127 B1 | 6/2003 | Sinclair |
| 5,909,586 A | 6/1999 | Anderson | 6,584,571 B1* | 6/2003 | Fung .......................... 713/310 |
| 5,920,884 A | 7/1999 | Jennings, III et al. | 6,587,382 B1 | 7/2003 | Estakhri et al. |
| 5,924,113 A | 7/1999 | Estakhri et al. | 6,711,059 B2 | 3/2004 | Sinclair et al. |
| 5,928,370 A | 7/1999 | Asnaashari | 6,721,819 B2 | 4/2004 | Estakhri et al. |
| 5,930,815 A | 7/1999 | Estakhri et al. | 6,721,843 B1 | 4/2004 | Estakhri |
| 5,933,368 A | 8/1999 | Ma et al. | 6,725,321 B1 | 4/2004 | Sinclair et al. |
| 5,933,846 A | 8/1999 | Endo | 6,725,385 B1* | 4/2004 | Chu et al. .................... 713/320 |
| 5,936,971 A | 8/1999 | Harari et al. | 6,728,851 B1 | 4/2004 | Estakhri et al. |
| 5,937,425 A | 8/1999 | Ban | 6,751,155 B2 | 6/2004 | Gorobets |
| 5,953,737 A | 9/1999 | Estakhri et al. | 6,757,800 B1 | 6/2004 | Estakhri et al. |
| 5,956,473 A | 9/1999 | Ma et al. | 6,772,274 B1 | 8/2004 | Estakhri |
| 5,959,926 A | 9/1999 | Jones et al. | 6,813,678 B1 | 11/2004 | Sinclair et al. |
| 5,966,727 A | 10/1999 | Nishino | 6,820,209 B1* | 11/2004 | Culbert et al. .............. 713/501 |
| 5,986,933 A | 11/1999 | Takeuchi et al. | 6,898,662 B2 | 5/2005 | Gorobets |
| 5,987,563 A | 11/1999 | Itoh et al. | 6,912,618 B2 | 6/2005 | Estakhri et al. |
| 5,987,573 A | 11/1999 | Hiraka | 6,950,918 B1 | 9/2005 | Estakhri |
| 5,991,849 A | 11/1999 | Yamada et al. | 6,957,295 B1 | 10/2005 | Estakhri |
| 6,011,322 A | 1/2000 | Stumfall et al. | 6,973,519 B1 | 12/2005 | Estakhri et al. |
| 6,011,323 A | 1/2000 | Camp | 6,978,342 B1 | 12/2005 | Estakhri et al. |
| 6,018,265 A | 1/2000 | Keshtbod | 7,000,064 B2 | 2/2006 | Payne et al. |
| 6,021,408 A | 2/2000 | Ledain et al. | 2003/0033471 A1 | 2/2003 | Lin |
| 6,026,020 A | 2/2000 | Matsubara et al. | | | |
| 6,026,027 A | 2/2000 | Terrell, II et al. | FOREIGN PATENT DOCUMENTS | | |
| 6,034,897 A | 3/2000 | Estakhri et al. | EP | 0 220 718 A2 | 5/1987 |
| 6,035,357 A | 3/2000 | Sakaki | EP | 0 243 503 A1 | 11/1987 |
| 6,040,997 A | 3/2000 | Estakhri | EP | 0 392 895 A2 | 10/1990 |
| 6,041,001 A | 3/2000 | Estakhri | EP | 0 424 191 A2 | 4/1991 |
| 6,047,352 A | 4/2000 | Lakhani et al. | EP | 0 489 204 A1 | 6/1992 |
| 6,055,184 A | 4/2000 | Acharya et al. | EP | 0 522 780 A2 | 1/1993 |
| 6,055,188 A | 4/2000 | Takeuchi et al. | EP | 0 522 780 B1 | 1/1993 |
| 6,069,827 A | 5/2000 | Sinclair | EP | 0 544 252 A2 | 6/1993 |
| 6,072,796 A | 6/2000 | Christensen et al. | EP | 0 613 151 A2 | 8/1994 |
| 6,076,137 A | 6/2000 | Asnaashari | EP | 0 617 363 A2 | 9/1994 |
| 6,081,447 A | 6/2000 | Lofgren et al. | EP | 0 619 541 A2 | 10/1994 |
| 6,081,878 A | 6/2000 | Estakhri et al. | EP | 0 663 636 A1 | 7/1995 |
| 6,084,483 A | 7/2000 | Keshtbod | EP | 0 686 976 A2 | 12/1995 |
| 6,097,666 A | 8/2000 | Sakui et al. | EP | 0 891 580 B1 | 11/2000 |
| 6,115,785 A | 9/2000 | Estakhri et al. | EP | 0 896 699 B1 | 11/2000 |
| 6,122,195 A | 9/2000 | Estakhri et al. | EP | 0 852 766 B1 | 8/2001 |
| 6,125,424 A | 9/2000 | Komatsu et al. | EP | 0 852 765 B1 | 9/2001 |
| 6,125,435 A | 9/2000 | Estakhri et al. | EP | 0 722 585 B1 | 5/2002 |
| 6,128,695 A | 10/2000 | Estakhri et al. | EP | 0 897 579 B1 | 6/2002 |
| 6,134,145 A | 10/2000 | Wong | EP | 0 910 826 B1 | 6/2002 |
| 6,134,151 A | 10/2000 | Estakhri et al. | EP | 0 691 008 B1 | 11/2002 |
| 6,141,249 A | 10/2000 | Estakhri et al. | EP | 0 861 468 B1 | 4/2003 |
| 6,145,051 A | 11/2000 | Estakhri et al. | EP | 0 978 040 B1 | 5/2004 |
| 6,151,247 A | 11/2000 | Estakhri et al. | EP | 1 157 328 B1 | 5/2005 |
| 6,172,906 B1 | 1/2001 | Estakhri et al. | FR | 93 01908 | 8/1993 |
| 6,173,362 B1 | 1/2001 | Yoda | GB | 1 574 058 | 9/1980 |
| 6,181,118 B1 | 1/2001 | Meehan et al. | GB | 2 235 787 A | 3/1991 |
| 6,182,162 B1 | 1/2001 | Estakhri et al. | GB | 2 251 323 | 7/1992 |
| 6,202,138 B1 | 3/2001 | Estakhri et al. | GB | 2 291 990 | 2/1996 |
| 6,223,308 B1 | 4/2001 | Estakhri et al. | GB | 2 291 991 A | 7/1996 |
| 6,226,708 B1 | 5/2001 | McGoldrick et al. | GB | 2 297 637 A | 7/1996 |
| 6,230,234 B1 | 5/2001 | Estakhri et al. | GB | 2 304 428 | 3/1997 |
| 6,262,918 B1 | 7/2001 | Estakhri et al. | GB | 2 335 293 A | 9/1999 |
| 6,272,610 B1 | 8/2001 | Katayama et al. | GB | 2 354 123 A | 12/1999 |
| 6,275,436 B1 | 8/2001 | Tobita et al. | GB | 2 347 531 A | 9/2000 |
| 6,279,069 B1 | 8/2001 | Robinson et al. | GB | 2 348 991 B | 12/2002 |
| 6,279,114 B1 | 8/2001 | Toombs et al. | GB | 2 351 822 B | 1/2003 |
| 6,285,607 B1 | 9/2001 | Sinclair | GB | 2 384 337 A | 7/2003 |
| 6,327,639 B1 | 12/2001 | Asnaashari | GB | 2 384 883 A | 10/2005 |
| 6,345,367 B1 | 2/2002 | Sinclair | GB | 2 384 338 A | 11/2005 |
| 6,374,337 B1 | 4/2002 | Estakhri | | | |

| | | |
|---|---|---|
| GB | 2 384 072 B | 12/2005 |
| GB | 2 411 499 B | 2/2006 |
| IS | 117881 | 5/2003 |
| JP | 3-228377 | 10/1981 |
| JP | 59-45695 A | 9/1982 |
| JP | 58-215794 A | 12/1983 |
| JP | 58-215795 A | 12/1983 |
| JP | 59-92483 | 5/1984 |
| JP | 59-162695 A | 9/1984 |
| JP | 60-212900 | 10/1985 |
| JP | 61-96598 A | 5/1986 |
| JP | 62-283496 A | 12/1987 |
| JP | 62-283497 A | 12/1987 |
| JP | 63-183700 A | 7/1988 |
| JP | 1-138694 | 5/1989 |
| JP | 4-57295 | 2/1992 |
| JP | 4-254994 | 9/1992 |
| JP | 4-268284 | 9/1992 |
| JP | 4-278297 | 10/1992 |
| JP | 4-332999 A | 11/1992 |
| JP | 5-128877 | 5/1993 |
| JP | 5-282883 | 10/1993 |
| JP | 6-4399 | 1/1994 |
| JP | 6-36578 | 2/1994 |
| JP | 6-124175 | 5/1994 |
| JP | 6-124231 | 5/1994 |
| JP | 6-131889 | 5/1994 |
| JP | 6-132747 | 5/1994 |
| JP | 6-149395 | 5/1994 |
| JP | 6-266596 | 9/1994 |
| JP | 7-84871 | 3/1995 |
| JP | 7-93499 | 4/1995 |
| JP | 7-114499 | 5/1995 |
| JP | 7-141258 | 6/1995 |
| JP | 7-235193 | 9/1995 |
| JP | 7-311708 | 11/1995 |
| JP | 7-334996 | 12/1995 |
| JP | 8-18018 | 1/1996 |
| JP | RM-37697 | 2/1996 |
| JP | 8-69696 | 3/1996 |
| JP | 9-147581 | 6/1997 |
| SU | 1388877 A1 | 4/1988 |
| SU | 1408439 A1 | 7/1988 |
| SU | 1515164 A1 | 10/1989 |
| SU | 1541619 A1 | 2/1990 |
| SU | 1573458 A2 | 6/1990 |
| SU | 1686449 A2 | 10/1991 |
| WO | 84/00628 | 2/1984 |
| WO | WO 94/20906 | 9/1994 |

OTHER PUBLICATIONS

Magazine—"State of the Art: Magnetic VS. Optical Store Data in a Flash", by Walter Lahti and Dean McCarron, Byte magazine dated Nov. 1, 1990. 311, vol. 15, No. 12.
Magazine—Technology Updates, Integrated Cirrcuits, "1-Mbit flash memories seek their role in system design", Ron Wilson, Senior Editor, Computer Design magazine 28 (1989) Mar. 1, No. 5, Tulsa OK, US, pp. 30 and 32.
1992 Symposium of VLSI Circuits Digest of Techical Papers, "EEPROM for Solid State Disk Applications", S. Mehoura et al., SunDisk Corporation, Santa Clara, CA, R.W. Gregor et al., AT&T Bell Laboratories. Allentown, PA. pp. 24 and 25.
Mendel Rosenblum and John K. Ousterhout, The Design and Implamention of a Log-Structured File System, article, 1991, 15 pgs., Berkeley, USA.
Brian Dipert and Markus Levy, Designing with Flash Memory, book, Apr. 1994, 445 pgs., Annabooks, San Diego, USA.
Science Forum, Inc., Flash Memory Symposium '95,symposium, 1995, 13 pgs.; Hongo,Bunkyo-ku, Tokyo.
Ross S. Finlayson and David R. Cheriton, An Extended File Service Exploiting Write-Once Storage, article, 1987, 10 pgs. ACM.
Jason Gait, The Optical File Cabinet: A Random-Access File System for White-Once Optical Disks, article, Jun. 1988, 12 pgs., Beaverton, Oregon.
Henry G. Baker, Memory Management, book, 1995, 19 pgs., Springer-Verlag Berlin Heidelberg, Germany.
Sape J. Mullender and Andrew S. Tanenbaum, A Distributed File Service Based on Optimistic Concurrency Control, article, 1985, 12 pgs., ACM.
Hiroshi Nakamura, Junichi Miyamoto, Kenichi Imamiya and Yoshihisa Iwata, A Novel Sense Amplifier for Flexible Voltage Operation NAND Flash Memories, symposium, 1995, VLSI Circuits Digest of Technical Papers., 2 pgs.
Hiroshi Nakamura, Junichi Miyamoto, Kenichi Imamiya, Yoshihisa Iwata, Yoshihisa Sugiura and Hideko Oodaira, A Novel Sensing Scheme with On-Chip Page Copy for Flexible Voltage NAND Flash Memories, article, Jun. 1996, 9 pgs.., vol. E79-C. No. 6.
Takaaki Nozaki, Toshiaki Tanaka, Yoshiro Kijiya, Eita Kinoshita, Tatsuo Tsuchiya and Yutaka Hayashi, A 1-Mb EEPROM with MONOS Memory Cell for Semiconductor Disk Application, article, 1991, 5 pgs., Journal Of Solid—State Circuits, vol. 26, No. 4.
Kai Hwang and Faye A Briggs, Computer Architecture and parallel Processing, book, 1984, McGraw-Hill, Inc., 2 pgs., US.
Walter Lahti and Dean McCarron, State of the Art: Magnetic VS. Optical Store Data in a Flash, article, 1990, 7 pgs., vol. 15, No. 12, McGraw-Hill, Inc., US.
Ron Wilson, Integrated Circuits: 1-Mbit flash memories seek their role in system design, article, Mar. 1, 1989, 2pgs., No. 6, Tulsa, OK.
S. Mehroura, J.H. Yuan, R.A. Cemea, W.Y. Chien, D.C. Guteman, G. Samachisa, R.D. Noman, M. Mofidi, W.Lee Y. Fong, A. Mihnea E. Hann, R.W. Gregor, E.P. Eberhardt, J.R. Radosevich, K.R. Stiles, R.A. Kohler, C.W. Leung, and T.J. Mulrooney, Serial 9Mb F EEPROM for Solid State Disk Applications. symposium, 1992, 2 pgs., Mountain View, CA.
Steven H. Leibson, Nonvolatile, in-circuit-reprogrammable memories, article, Jan. 3, 1991, 12 pgs., EDN, Circle No. 12.
Ramon Caceres, Fred Douglis, Kai Li and Brian Marsh, Operating System Implications of Solid-State Mobile Computers, article, 7 pgs., Oct. 1993, Workshop on Workstation Operting Systems.
Michael Wu and Wily Zwaenepoel, A Non-Volatile, Main Memory Storage System, 12 pgs., 1994, ACM, San Jose, CA USA.
Dave Bursky, Innovative flash memories match DRAM densities: available with a choice of features, flash memories are finding homes in many systems (Includes related articles on the origins of flash, and on the differences between NAND and NOR flash memories), article, May 16, 1994, 9 pgs., Electronic Design, v.42, N.10, The Gale Group.
Anthony Cataldo, New flash enhancements up ante. (Intel's 28F400BV-120 and 28F004BV-120, Atmel's AT29BV010 and AT29BV020, and Samsung Semiconductor's KM29V32000 *flash* memory* devices) (Product Announcement), article, Mar. 13, 1995, 4 pgs., Electronic News, v.41, N.2056, The Gale Group.
Sam Weber, *Flash* modules' portability, reusability, small size valued for a host of APPs-Consumer formats flocking to *flash*, article, Jul. 22, 1996, 9 pgs., Electronic Engineering Times, N.911, CMP Media.
Toshiba, MOS Memory (Non-Volatile), 1995, Data Book.
Stan Baker, But Integration Calls for Hardware, Software Changes: Flash: designers face the dawn of a new memory age, article, Sep. 12, 2003, 5 pgs., Electronic Engineering Times, 1990, N.619, 41, CMP Media.
Toshiba, Toshiba Mos Digital Integrated Circuit Silicon Gate CMOS, (TC58NS512DC) Mar. 21, 2001, 43 pgs., Data Book.
Toshiba Corporation, SMIL (Smartmedia Interface Library) Hardware Edition Version 1.00, Jul. 1, 2000, 36 pgs., Data Book.
Toshiba, Toshiba MOS Digital Integrated Circuit Silicon Gate, (TC58512FT), Mar. 5, 2001, 43 pgs., Data Book.
Toshiba, Toshiba MOS Digital Integrated Circuit Silicon Gate, (TC58DVM92A1FT00), Jan. 10, 2003, 44 pgs., Data Book.
Toshiba, Toshiba MOS Digital Integrated Circuit Silicon Gate, (TC58DVG02A1FT00), Jan. 10, 2003, 44 pgs., Data Book.
Toshiba, Toshiba MOS Digital Integrated Circuit Silicon Gate, (TH58100FT), Mar. 5, 2001, 43 pgs., Data Book.

35Nonvolatile Memory Technology Review, A Time of Change, Proceedings 1993 Conference, Jun. 22-24, 1993, Linthicum Heights, MD USA.

Toshiba Corporation, SML (Smartmedia Interface Library) Software Edition Version 1.00, Jul. 1, 2000, 136 pgs., Data Book.

Toshiba, MOS Memory (Non-Volatile), 1996, 279 pgs., Data Book.

Dan Auclair, Optimal Solid State Disk Architecure For Portable Computers, symposium, Jul. 9, 1991, 7 pgs., SunDisk Corporation.

* cited by examiner

POWER MANAGEMENT SYSTEM

CROSS REFERENCE TO RELATED APPLICATION

This application claims the benefit of the priority date of my earlier filed British Application No. 0123421.0, entitled "Power Management System", filed on Sep. 28, 2001.

BACKGROUND OF THE INVENTION

1. Field of the Invention

This invention relates generally to a power management system for managing power used and energy consumed in a computer system, particularly a portable computer system where there is often a limit to the peak power that can be supplied and where the energy is usually provided by batteries which have a shorter life if required to deliver increased energy and particularly to a flash disc device which is a memory system having a controller which presents the logical characteristics of a disc storage device to a host, but, which uses a non-volatile semiconductor memory device as its physical storage medium.

2. Description of the Prior Art

Minimizing peak power (where power is energy per unit time) and minimizing energy consumption are sometimes conflicting aims. To minimize the peak power drawn by a Flash Storage System may require that the Flash Storage System takes longer to perform its operations, which can lead to higher energy dissipation since the system is active over a longer period, though at a lower power over this period.

The standard Flash Controller includes a number of hardware blocks. These blocks include a Host Interface Block, a Flash Interface Block and a Microprocessor Block, which are connected to memories via a System Bus. Each of these hardware blocks consumes energy within the Flash Controller. The Host Interface and Flash interface blocks also consume energy on external interfaces. To minimize the energy consumption of the whole computer system requires the minimization of energy consumption within the Flash Controller itself, within the Flash memory, and on the Flash and Host Interfaces.

Thus, a need arises to obviate or mitigate at least one of the aforementioned problems.

SUMMARY OF THE INVENTION

According to a first aspect of the invention there is provided a power management system for use in a computer system having a memory system incorporating a non-volatile memory and a controller which presents the logical characteristics of a disc storage device to a host, the power management system comprising means for monitoring the operational activity levels within at least some of the components of the controller and arranged, in response to the monitored levels, to vary the power consumed by selected components of the controller.

Preferably the power management system further comprises at least one power management algorithm which is implemented within firmware of the power management system.

In another of its aspects the present invention comprises a non-volatile memory system having a controller incorporating a plurality of components and which presents the logical characteristics of a disc storage device to a host, where the controller incorporates a power management system having means for monitoring the operational activity levels within at least some of the components of the controller, said means being arranged, in response to the monitored levels, to vary the power consumed by selected components of the controller.

The power management system may be embodied in a discrete system manager or in a distributed manner through components of the controller.

Preferably the power management system generates the main clock signals for the controller and determines which are active and the frequency of such active clock signals.

The foregoing and other objects, features and advantages of the present invention will be apparent from the following detailed description of the preferred embodiments which make reference to several figures of the drawing.

DETAILED DESCRIPTION OF THE PREFERRED EMBODIMENTS

Figure 1:
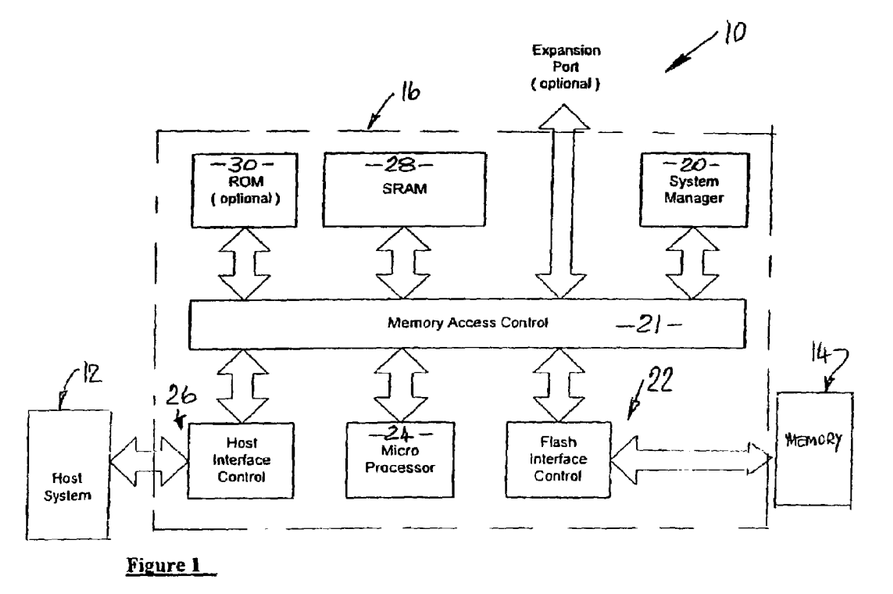
FIG. 1 illustrates a computer system incorporating a power management system in accordance with the present invention.

As is shown in FIG. 1, a computer system 10 comprises a flash memory 14, a flash controller 16 and host system 12. The controller 16 comprises a host interface block 16, a microprocessor 24, a flash interface block 22, an SRAM 28, a ROM 30, all of which are connected to a memory access control structure or system bus 21 in a manner which is well known in the art and which enables the memory system 16, 14, to present to the host system 12 the logical characteristics of a disc storage device.

Controller 16 of a system 10 additionally incorporates a power management system in the form of a system manager 20.

Having a discrete System Manager Block 20 simplifies the design and explanation of the power management features, however, the features to be described could equally be distributed and incorporated into other blocks within the hardware of controller 16. The term 'system manager' is intended to embrace both the distributed and the discrete arrangements.

The System Manager 20 is concerned with the control of reset, timing and interrupt signals within the controller 16, and the control logic for these signals may also be incorporated within the System Manager, however, this is not necessary for achieving power management.

Figure 2:
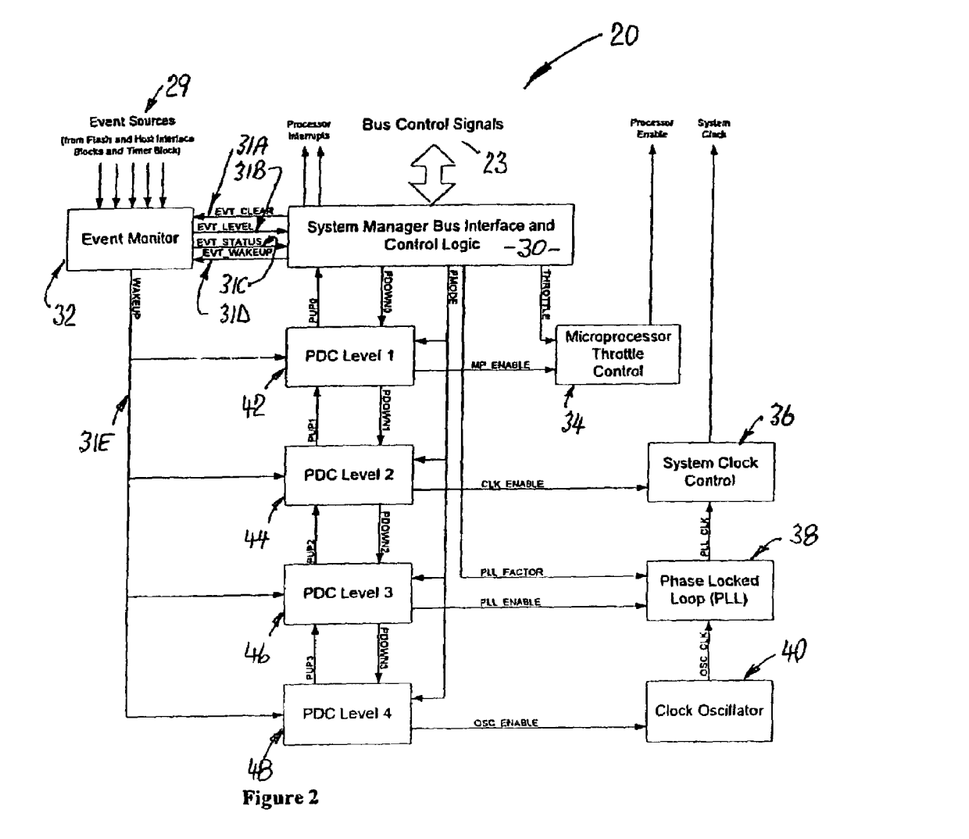
FIG. 2 illustrates the power management system of FIG. 1 in greater detail.

FIG. 2 shows the structure of the system manager 20. The system manager 20 comprises a system manager bus interface and control logic block 30 which connects the system manager 20 to the system bus 21 via bus interface 22. The system manager 20 also includes an event monitor block 32, a microprocessor throttle control block 34, system clock control block 36, a phase locked loop (PLL) block 38, clock oscillator block 40 power-down controller (PDC) level 1 block 42, PDC level 2 block 44, PDC level 3 block 46 and PDC level block 48.

The System Manager 20 generates clock signals for the rest of the controller 16. Though one clock is shown, multiple clocks for different parts of the controller 16 may be generated. Whether a clock is enabled, and its frequency, are determined by power management features. The system Manager 20 also generates other control signals to control activity within the Flash Controller 16. One signal enables the microprocessor 24. Firmware reads and writes to memory-mapped registers within the system manager 20 across the interface 30 via the system bus 21.

The Event Monitor 32 takes signals from a number of event sources 29 within the Flash Controller 16. These event sources 29 indicate when significant system events have occurred within other blocks of the controller 16 such as the Flash and Host Interface Blocks 22, 26 or the Microprocessor 24. For example, the flash and host interface blocks 22, 26 typically indicate when certain operations have completed via these signals. Events that are used to generate processor interrupts or wake-up from a power-down state are listed in Table 3. Synchronous events require the system clock to be running and so will not be generated when the controller is in power-down level 2 or higher. The processor 24 typically indicates when a special event has occurred, such as a request to enter a Debug or Test Mode. The event monitor 32 and system manger bus interface and control logic block 30 communicate via four channels which carry the signals EVT_CLEAR 31A, EVT_LEVEL 31B, EVT_STATUS 31C, and EVT_WAKEUP 31D.

The Event Monitor 32 feeds the existing level of these events to the Bus Interface and control logic block 30 on the EVT_LEVEL signal, which is composed of one bit per event. The event source signals can be de-asserted by the source at any time. In some cases, when the controller 16 is in a low-power state, it may not be able to respond to the EVT_LEVEL signal immediately, and could miss an event. Thus, the event monitor 32 provides a second copy of the events called EVT_STATUS, that cannot be de-asserted by the source of the event, but can be set (even when the rest of the system is in a low-power state). An event in EVT_STATUS can only be de-asserted by the Bus Control Logic Block 30 asserting the appropriate bit on the EVT_CLEAR signal or a System Reset.

During certain low-power modes, the Event Monitor 32 may be the only active part of the system manager 20. If required, it outputs a signal 31E to the rest of the System Manager 20 called WAKEUP, which causes the rest of the system manager 20 to exit from a low-power mode. The WAKEUP signal is asserted when an event is asserted on EVT_STATUS and the corresponding event bit is asserted on EVT_WAKEUP. Thus, the GBus Interface block 30 can control which events cause the manger 20 to wake-up. firmware via the Bus Interface 30 block reads the values of both EVT_LEVEL and EVT_STATUS and asserts EVT_CLEAR and EVT_WAKEUP.

Included within the System Manager 20 are blocks 36, 38, 40 for generating the main clock signals for the controller 16 and for enabling other blocks within the controller 16 such as the Microprocessor 24.

The clock generation chain consists of clock oscillator module 40, that generates the fundamental clock for the controller 16 (named OSC_CLK). The frequency of this clock is normally determined by external components such as a Quartz Crystal or a Resistor-Capacitor charging/discharging circuit. The next stage in the clock generation is the PLL (Phase Locked Loop) block 38 which takes the fundamental clock frequency OSC_CLK and multiplies it by a factor to generate the signal PLL_CLK. Finally, this goes into the system clock control block 36, which controls the distribution of the clock to the rest of the controller 16.

The System Manager 20 has four power-down modes that are used to control which clock signals are active within the controller 16. Successive Levels of Power-Down mode turn off more functionality within the controller 16 to save power. The term Power-Down Mode 0 is used to describe normal system operation when all parts of the controller 16 are active. Table 1 illustrates how functionality of the controller 16 is progressively turned off to save power with successive Power-Down Modes.

In Power-Down Mode 1 which is determined by block 42, the Microprocessor 24 is disabled in a controlled fashion, so that other blocks within the controller 16 such as the Flash and Host Interface Blocks 22, 26 can continue to access memory 14 and perform their functions. The enable signal to the processor 24 is turned off using the MP_ENABLE signal from block 42 that feeds into the Processor Throttling Block 34.

In Power-Down Mode 2 which is determined by block 44, the System Clock 36 is disabled using the CLK_ENABLE signal from block 44. Functions within the controller 16 that rely on the system clock being enabled are disabled and their power dissipation reduced or eliminated. A result of this is that the main system bus 21 will be disabled so that communication between blocks within the controller 16 across the bus 21 will be disabled.

In Power-Down Mode 3 which is determined by block 46, the PLL 38 is disabled using the PLL_ENABLE signal from block 46. PLL 38 may take a certain time to synchronize with the OSC_CLK signal from oscillator 40, so a synchronization delay is usually required when the controller is powering up from Power-Down Mode 3 to Power-Down Mode 2.

In Power-Down mode 4 which is determined by block 48, the clock oscillator 40 is disabled using the OSC_ENABLE signal from block 48. The clock oscillator 40 may take a certain time to start oscillating again depending on the nature of the external components used to determine the clock frequency, so a delay is required when the controller is powering up from Power-Down Mode 4 to Power-Down Mode 3.

As regards sequencing of power-down and power-up each PDC 42, 44, 46, 48 receives a request for entry to a power-down mode on a PDOWN signal or entry to a power-up mode on the PUP signal. For example, the first PDC 42 will power-down the part of the controller 16 that it controls and then if this is not the target Power-Down Mode (as indicated on the PMODE signal issued by block 30), it will assert its PDOWN signal to the next PDC 44 so that it should power-down and so on.

When the Event Monitor 32 asserts the WAKEUP signal 31E, the PDC's sequentially from the PDC of the target Power-Down Mode will wake-up the part of the controller 16 that it is responsible for. If a delay is required before this part of the controller 16 is ready then the PDC's ensure that this delay is met. The length of the delay may be configured Firmware writing to registers within the Bus Interface and Control Logic 30. The value of these registers is passed onto the appropriate PDC, which alters the Power-Up delay to reflect the register value. These signals indicating the length of the delay are not illustrated. Finally the PDC asserts its Power-Up output PUP which causes the next PDC in the chain to wake-up in a similar fashion.

Initially entry to a power-down mode is made by firmware writing to a register within the System Manager Bus Interface and Control Logic block 30, which indicates the desired Power-Down Mode. This causes the PMODE signal to indicate the target power-down level, and the PDOWN0 signal to be asserted which initiates the entry into the Power-Down Mode.

The modular structure of one PDC 42, 44, 46, 48 for each section of the clock generation and processor control 34, 36, 38, 40 allows the structure to be easily adapted for different clock generation structures. In addition, this structure is robust in that it guarantees that the controller 16 is powered-down and powered-up in an orderly manner, so that, for example, the processor 24 is not powered-up before the system clock signal is enabled.

A second power-management feature of the manager 20 is the ability to change the clock frequency by changing the multiplication factor that relates the PLL 38 input frequency to its output frequency. Lowering the Clock frequency lowers the power dissipation within the controller 16, but, also can reduce the data transfer performance of the controller 16.

To vary the PLL multiplication factor firmware writes to a register within the Bus Interface and Control Logic block 30 which sets the value of PLL_FACTOR that indicates the PLL Multiplication Factor. In some cases, Firmware may want the value of PLL_FACTOR to be reset to a certain value when a system event occurs. For example, the Firmware sets a low clock frequency to reduce power, but it then wants to process an interrupt quickly, the firmware may not want to continue to run at the low clock frequency. However, it takes a certain amount of time to write to the register that determines PLL_FACTOR. To overcome this problem, the firmware can set a flag within the Bus Interface and Control Logic block 30 which will cause the block 30 to reset the PLL_FACTOR when certain events occur as indicated by the Event Monitor 32.

The Microprocessor 24 is often the main source of power dissipation in the Controller 16 as it consumes power itself and also is the main source of memory access requests within the Controller 16. To allow the power consumption of the Microprocessor 24 to be controlled the System Manager 20 includes a Microprocessor Throttle Block 34.

The Throttle Block 34 controls how often the Microprocessor 24 is enabled. The fewer clock cycles that the Microprocessor 24 is enabled for, the lower the power it consumes. The mechanism used to achieve disablement of the Microprocessor 24 can vary. For example, the output of throttle block 34 can be used directly to disable the Microprocessor 24 or to switch off the clock signal within controller 16 to the Microprocessor 24. Alternatively, the output of the throttle block 34 can be used to deny access of the Microprocessor 24 to the Main-System Bus 21, thus preventing it from fetching instructions and causing it to halt.

The Throttle Block 34 takes two inputs: one is MP_ENABLE from the PDC 42 for the Power-Down Mode 1. The MP_ENABLE signal is used to completely disable the Microprocessor 24 when Power-Down Mode 1 is entered. The other input to the Throttle Block 34 is THROTTLE which consists of three values M,S and B which determine the proportion of time that the Microprocessor 24 is enabled. The value of THROTTLE can be changed by the firmware writing to registers within the Bus Interface and Control Logic Block 30.

The values M (Mark) and S (Space) determine the ratio of clock cycles for which the Microprocessor 24 is enabled and disabled. The B value determines the minimum number of clock cycles in a row the Microprocessor 24 will be enabled or disabled for. This allows the Microprocessor 24 to gain access to the Memory 14 for a minimum number of clock cycles, since there would be overhead and inefficiencies when enabling and disabling the Microprocessor 24 for too few clocks cycles.

Thus, the values M, S and B indicate that the Microprocessor 24 is enabled for M*B clock cycles from every (M+S)*B clock cycles. The hardware interleaves M blocks of cycles with S blocks of cycles in an optimum way to minimize long sequences of cycles with the Microprocessor 24 disabled, which could reduce the Microprocessor 24 responsiveness to events such as interrupts.

The pattern set by M, S, and B is as follows. The pattern starts with a block of B clock cycles with the Microprocessor 24 being enabled and then B clock cycles this with the Microprocessor 24 being disabled. The alternation of blocks of the Microprocessor 24 being enabled and disabled repeats up to the minimum value from M and S. If M=S then the pattern now repeats, otherwise, if M>S, then the Microprocessor 24 is enabled for M−S blocks of B clock cycles and then the pattern repeats, but, if M<S then the Microprocessor 24 is disabled for S−M blocks of B clock cycles and then the pattern repeats.

The hardware always ensures that the first block within a pattern of enabling and disabling the Microprocessor 24 has the Microprocessor 24 enabled regardless of the value of M, thus setting M=0 is equivalent to M=1 in order to prevent the Microprocessor 24 being never enabled. The hardware also interprets the value of B=0 as the maximum block size allowed by the hardware.

Some examples of the patterns possible of the hardware enabling and disabling the Microprocessor 24 for different values of M, S and B are shown in Table 2.

Other schemes for defining the ratio of cycles for which the microprocessor 24 is enabled and disabled are possible.

As with the PLL Multiplication Factor feature discussed previously, it is useful to allow Firmware to allow the Microprocessor Throttle 34 to reset the time for which the Microprocessor 24 is enabled to its maximum value when certain system events occurs, to allow for fast reaction to controller events. Firmware can write to a register within the Bus Interface and Control Logic block 30 to enable this feature.

It will be appreciated that the Flash Interface Block 22 is non standard in that it incorporates features to operate with a range of different main system clock frequencies, since the main clock frequency of the controller 16 may be changed to reduce power consumption by operation of blocks 36, 38 of the system manager 20.

If the main clock frequency of the flash controller is changed then this will affect the timing of signals generated by the Flash Interface Block 22. If the clock frequency is increased then the timing of signals on the flash interface may become too quick for the Flash memory 14. If the clock frequency is decreased then the transfer rate of data to and from the Flash memory 14 will be reduced.

If the Flash Interface 22 is a major source of power dissipation, then it may be advantageous to reduce the transfer rate on the interface to reduce peak power consumption, but this reduces the data transfer rate to and from the Flash memory 14.

Accordingly, to support these power management modes, the Flash Interface Block 22 is designed to allow the timing of signals to and from the Flash memory 14 to be changed relative to the main controller system clock. Two features in the Flash Interface Block 22 are incorporated to support this. The first feature is a frequency divider circuit that is placed on the main clock that supplies the basic timing reference for the signals on the Flash interface 22. This allows the speed of the Flash Interface to be reduced to reduce peak power consumption, without affecting the frequency of the main clock. The second feature is the timing of signals in the Flash interface 22 can be controlled on a clock cycle by clock cycle basis. When the main clock frequency is decreased; this allows the timing of signals to be made quicker by reducing the number of clock cycles for which a signal on the Flash Interface is asserted or de-asserted.

Finally, the Flash Interface Block 22 is designed so that it can use the power management features within the Flash memory 14 which requires that Flash memory select signal to be taken to a voltage close to that of the power supply rail to engage a low power mode.

It will further be understood that the host interface block 26 is different from the flash interface block 22, in the most actions on the host interface block 26 are initiated and timed by the host 12 and not by the controller 15. Many host interface protocols allow the Flash Storage System 14, 16 to indicate at system power-up what host interface timing will be used, but do not allow this timing to be changed later.

Though in most Host interface protocols, the data transfer rate to and from the Flash Storage System 14, 16 is determined by the host 12, most host interface transfer protocols allow the Flash Storage System 14, 16 to indicate when it is ready to accept the transfer of data or of a command. The Flash Controller 16 uses this feature of the host interface 26 to control the rate of data and command transfer and thus minimize peak power though this reduces system performance. To support this, the Host Interface block 26 needs to be flexible in when it asserts signals that say if it is ready to accept a command or do a data transfer. If features are incorporated to let hardware automatically set these signals, then the automatic setting of these signals should configurable, so that flags can be set under direct Firmware control if necessary for power management.

If the protocol allows for the basic timing of a data or command transfer to be slowed down by asserting signals on the interface 26 during the transfer then these should also be settable by Firmware to allow the transfer rate to be reduced.

Reference has been made to firmware that has to utilize the power management features within the flash controller hardware to minimize power consumption with minimal impact or performance. This will now be explained.

If at a point within the firmware, the firmware has to stop and wait for an event monitored by the Event Monitor 32, then the firmware enables the system manager 20 to wake-up on this event and then enter a power-down mode. The Power-Down Mode powered-down to is determined by activity in other parts of the controller 16. For example, if the Host or Flash interface 26, 22 need the clock to be running to transfer data then Power-Down Level 1 is the maximum level that can be entered. Higher power down levels can be entered if no such constraint exists, but may be limited by the time taken for the Oscillator 40 and PLL 38 to power-up.

Other events that are required to interrupt the processor 24 also trigger the system manager 20 to wake-up. If the system manager 20 is woken-up by an interrupt event, it then responds to the interrupt and then the Firmware returns to the Power-down mode selected, if the system event being waited for has not occurred.

Examples of doing this are events such as waiting for the host 12 to issue a command or transfer data, or waiting for Flash memory 14 to complete an operation.

Events within the controller 16 that are not monitored by the Event Monitor 32 cannot cause the system manager 20 to wake-up. In these cases the Microprocessor 24 has to wait, polling a register until the event occurs. In this mode, the Microprocessor 24 must be active, but, need not run at full speed.

Accordingly using the Microprocessor Throttling mechanism of block 34 can reduce power consumption in this case by reducing the frequency of polling the register. Also, when reducing the clock frequency will not affect the performance of other parts of the controller 16 then the PLL multiplication factor of block 38 can be reduced. When the event being polled for has occurred, the firmware can return the controller 16 to its normal operating frequency.

When firmware determines that it needs to limit power consumption on the Host Interface Block 26, then it can reduce the power being consumed by indicating to the Host 12 that it is busy, even when it has actually finished an operation or is ready to accept data. During this time, the controller 16 can perform other operations, or the controller 16 can enter a Power-Down Mode for a period of time to lower power consumption and trigger the system manager 20 to wake-up after a specified time by using an event triggered by a timer within the Flash Controller 16. At this point, the controller 16 can release busy and continue operation. As an alternative to asserting busy, the controller 16, if the host interface transfer protocol permits, can slow sown the host transfer timing. This allows the host 12 to continue data transfer but at a reduced rate.

When the controller cycle time is changed to reduce power, Firmware may choose to adjust the timing of the Flash interface 22 to use fewer clock cycles to ensure that the transfer rate to memory 14 is maintained.

If Firmware wants to reduce power consumption specifically on the Flash interface 22 then it can lengthen the timing of commands on the Flash Interface 22, though this will reduce the transfer rate to memory 14. One example, of lengthening Flash Commands is when polling the status of the memory 14. Firmware can lengthen the timing of the polling command, and then set the Flash Interface 22 to trigger an event when the Polling command has finished. Firmware can then go to sleep for the duration of the polling command.

When Firmware enters sections of code that requires the Microprocessor 24 to be active for a long period of time, then peak power consumption can be reduced by using the Microprocessor Throttle Mechanism of block 34 and the PLL Multiplication Factor of block 38.

Figure 3:
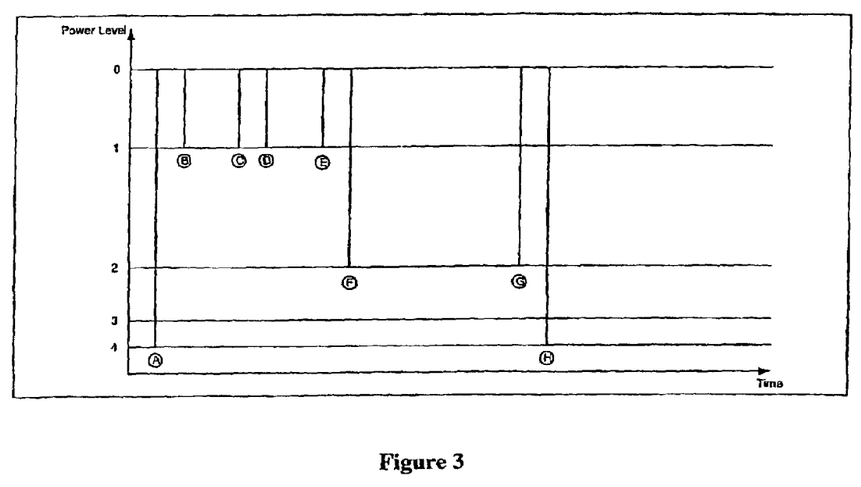
FIG. 3 illustrates an example of the way in which the controller 16 of FIG. 1 switches between different power levels during the execution of a Write Sector command from a host.

An example of the way in which the controller switches between different power levels during the execution of a Write Sector command from a host is given with reference to FIG. 3. The relative levels of the different power levels are for illustration only. In this example, the controller does not need to respond rapidly to host commands, and the startup times of clock oscillator 40 and phase locked loop 38 during wake-up from power-down levels 4 and 3 are not important. If fast response to a host command is required, it might not be possible to switch to power-down level 4 when the host interface is in the idle state.

At time A the host writes a command to the controller, which generates event 4 shown in Table 3 and causes the controller to wake-up through levels 3, 2 and 1 before the processor starts executing in level 0.

The processor clears the host command event and sets up the DMA hardware to allow the host to transfer data to the controller. Once the DMA is set up, the controller is put into power-down level 1 at time B. It is not possible to enter a higher power down level as the MDA transfer requires that the system clock is running.

When the host transfers the required data at time C, event 5 is generated and wakes up the controller to power-down level 0. The processor now sets up the Flash Interface Control to transfer the data to Flash memory and then reverts to power-down level 1 at time D. Again, a higher power-down mode cannot be used because the transfer to Flash memory requires that the system clock is running., When the data transfer to Flash memory completes at time E, event 7 is generated. The controller again wakes up to power down level 0. The processor checks that the transfer was successful, starts the Flash programming operation and then enters power-down level 2 at time F, which halts the system clock.

At time G, the Flash programming operation completes and the Flash busy line makes a low to high transition, which generates event 6. The controller wakes up through power-down level 1 to power-down level 0. The processor checks that the programming operation was successful, sets up the response to the host and powers-down to level 4 at time H.

Although the present invention has been described in terms of specific embodiments it is anticipated that alterations and modifications thereof will no doubt become apparent to those skilled in the art. It is therefore intended that the following claims be interpreted as covering all such alterations and modification as fall within the true spirit and scope of the invention.

TABLE 1

Power Down Modes

| Power Down Mode: | 0 | 1 | 2 | 3 | 4 |
|---|---|---|---|---|---|
| Microprocessor Enabled | Y | N | N | N | N |
| System Clock Enabled | Y | Y | N | N | N |
| PLL Enabled | Y | Y | Y | N | N |
| Oscillator Enabled | Y | Y | Y | Y | N |

TABLE 2

Pattern of Microprocessor Access with varying M, S and B

| M | S | B | Pattern of Enabling and Disabling Microprocessor<br>M = microprocessor enabled<br>S = microprocessor disabled |
|---|---|---|---|
| 1 | 1 | 1 | MS |
| 1 | 1 | 3 | MMMSSS |
| 1 | 3 | 3 | MMMSSSSSSSSS |
| 4 | 2 | 1 | MSMSMM |
| 0 | 2 | 2 | MMSSSS |
| 2 | 0 | 2 | MMMM |

TABLE 3

| Event | Synchronous/<br>Asynchronous | Description |
|---|---|---|
| 0 | Async | Host Reset 0.<br>Triggered when the host reset goes from logic 1 to logic 0. |
| 1 | Async | Host Reset 1<br>Triggered when the host reset goes from logic 0 to logic 1 |
| 2 | Async | Host Software Reset 0<br>Host Software reset bit change from 1 to 0 triggers this event. |

TABLE 3-continued

| Event | Synchronous/<br>Asynchronous | Description |
|---|---|---|
| 3 | Async | Host Software Reset 1<br>Host Software reset bit change from 0 to 1 triggers this event. |
| 4 | Async | Host Command<br>The host interface block generates this interrupt when a new host command is received. |
| 5 | Async | Host DMA Completion<br>The host interface block generates this interrupt when a Host DMA Transfer is complete. |
| 6 | Async | Flash Not Busy<br>Generated when a BUSY signal from Flash memory goes high. |
| 7 | Sync | Flash Interface Control Operation Complete<br>Generated when completes the current sequence of operations. |
| 8 | Sync | Timer Interrupt<br>Generated when the internal timer reaches zero. |
| 9 | Async | Host Activity<br>Generated when activity on Host Interface. |

What is claimed is:

1. A power management system for use in a computer system comprising:
   a computer system including,
      a non-volatile memory; and
      a controller coupled to the non-volatile memory representing the logical characteristics of a disc storage device to a host including a system manager for generating a plurality of clock signals to components of the controller and for further generating control signals to control activity within the controller by monitoring the operational activity levels within at least some of the components of the controller and arranged, in response to the monitored levels, to vary the power consumed by selected components of the controller and including an event monitor receptive to event sources indicative of the occurrence of significant system events and in response thereto varying power consumption,
   wherein the power management system is capable of entering various power modes one of which is a low-power mode, the event monitor being the only active part of the system manager, the event monitor outputting a WAKEUP signal to the rest of the system manager components, which causes the rest of the system manager to exit from a low-power mode,
   the system manager further including a system clock control module that generates an OSC_CLK clock for the controller having a frequency determined by external components to the controller, the system manager further including a phase locked loop (PLL) block responsive to the OSC_CLK clock for generating a PLL_CLK that is a factor of magnitude, in frequency, of that of the frequency of the OSC_CLK clock.

2. A power management system as recited in claim 1 wherein the power management system is embodied in a discrete system manager.

3. A power management system as recited in claim 1 wherein the system manager further includes an bus interface block coupled to the event monitor for controlling which events cause the system manager to wake-up.

4. A power management system as recited in claim 1 wherein the system manager further includes a system clock control block receptive to the PLL_CLK clock for controlling the distribution of the clock to the rest of the controller.

5. A power management system as recited in claim 4 wherein the system manager further includes a plurality of power down blocks responsive to the WAKEUP signal and for causing the power consumption of various components of the controller to vary based upon the monitored levels.

6. A power management system as recited in claim 5 wherein the controller further includes a microprocessor, the plurality of power down blocks including a first power down block for disabling the microprocessor, in a controlled fashion, so that other components within the controller can continue to access the memory and to perform their functions.

7. A power management system as recited in claim 6 wherein the plurality of power down blocks includes a second power down block for generating a CLK_ENABLE signal to disable the system clock control block.

8. A power management system as recited in claim 7 wherein the plurality of power down blocks includes a third power down block for generating a PLL_ENABLE signal to disable the PLL block.

9. A power management system as recited in claim 8 wherein the plurality of power down blocks includes a fourth power down block for generating an OSC_ENABLE signal for disabling the system clock control module.

10. A power management system as recited in claim 9 wherein a power down mode is entered wherein each of the plurality of the power down blocks will enter a power down mode to disable the components for which each is responsible and sequentially alert another power down block of the plurality of power down blocks until a target power down level is reached.

11. A power management system as recited in claim 9 wherein the event monitor asserts the WAKEUP signal causing each of the plurality of the power down blocks to sequentially enable the the components of the controller for which each is responsible.

12. A power management system as recited in claim 11 wherein each of the plurality of the power down blocks enters a power down mode, indicated by a PMODE signal, indicative of a target power-down level.

13. A power management system as recited in claim 12 wherein the system manager further includes a throttle block coupled to the bus interface block for controlling how often the microprocessor is enabled thereby reducing power consumption of the microprocessor.

14. A power management system as recited in claim 13 wherein the throttle block receives, as input, values M (Mark) and S (Space) and B for determining the proportion of time that the microprocessor is enabled, the values M and S determine the ratio of clock cycles for which the microprocessor is enabled and disabled, the B value determines the minimum number of clock cycles in a row that the microprocessor is enabled or disabled thereby limiting the microprocessor to gain access to the memory for a minimum number of clock cycles.

15. A power management system as recited in claim 14 wherein the values M, S and B indicate that the microprocessor is enabled for M*B clock cycles from every (M+S)*B clock cycles thereby optimally interleaving M blocks of cycles with S blocks of cycles to minimize long sequences of cycles with the microprocessor disabled.

16. A method for performing power management of a computer system comprising:
   generating a plurality of clock signals to components of a controller coupled to non-volatile memory to control activity within the controller;
   monitoring the operational activity levels within at least some of the components of the controller and arranged, in response to the monitored levels;
   varying the power consumed by selected components of the controller;
   generating event sources indicative of the occurrence of significant system events;
   in response to the generated event sources, varying power consumption;
   entering a low-power mode wherein the event monitor is the only active part of the system manager;
   outputting a WAKEUP signal to the rest of the system manager components, which
   causes the rest of the system manager to exit from a low-power mode;
   generating an OSC_CLK clock for the controller having a frecquency determined by external components to the controller; and
   generating a PLL_CLK that is a factor of magnitude, in frequency, of that of the frequency of the OSC_CLK clock.

* * * * *